United States Patent
Qasymeh et al.

(10) Patent No.: US 12,149,292 B2
(45) Date of Patent: Nov. 19, 2024

(54) QUANTUM TELEPORTATION NETWORK USING A SYSTEM OF ELECTRONICALLY ENABLED GRAPHENE WAVEGUIDES

(71) Applicant: Abu Dhabi University, Abu Dhabi (AE)

(72) Inventors: Montasir Yousof Abdallah Qasymeh, Abu Dhabi (AE); Hichem El Euch, Abu Dhabi (AE); Muhammad Asjad, Abu Dhabi (AE)

(73) Assignee: Abu Dhabi University, Abu Dhabi (AE)

( * ) Notice: Subject to any disclaimer, the term of this patent is extended or adjusted under 35 U.S.C. 154(b) by 459 days.

(21) Appl. No.: 17/670,466

(22) Filed: Feb. 13, 2022

(65) Prior Publication Data

US 2023/0037977 A1  Feb. 9, 2023

Related U.S. Application Data

(63) Continuation-in-part of application No. 17/367,348, filed on Jul. 3, 2021.

(51) Int. Cl.
| | |
|---|---|
| H04B 10/00 | (2013.01) |
| G02F 1/025 | (2006.01) |
| H04B 10/70 | (2013.01) |
| H04L 9/08 | (2006.01) |
| G06N 10/40 | (2022.01) |

(52) U.S. Cl.
CPC .............. *H04B 10/70* (2013.01); *G02F 1/025* (2013.01); *H04L 9/0852* (2013.01); *G02F 2203/10* (2013.01); *G06N 10/40* (2022.01)

(58) Field of Classification Search
CPC ....... H04B 10/70; G02F 1/025; G02F 1/0356; G02F 1/355; G02F 1/353; G02F 3/00; G06N 10/00; G02B 6/1226
USPC ....... 398/140, 141, 142, 158, 159, 160, 173, 398/177, 181, 176, 135, 136, 137, 138, 398/139; 380/255, 256, 278, 277, 44
See application file for complete search history.

(56) References Cited

U.S. PATENT DOCUMENTS

| | | | |
|---|---|---|---|
| 10,824,048 B2 | 11/2020 | Qasymeh | |
| 11,048,107 B2 | 6/2021 | Qasymeh | |
| 2021/0107794 A1* | 4/2021 | Qasymeh | ................. G02F 1/355 |
| 2023/0016333 A1* | 1/2023 | Qasymeh | .............. H04L 9/0852 |

OTHER PUBLICATIONS

J.I. Cirac and P. Zoeller and H.J. Kimble and H. Mabuchi, Quantum State Transfer and Entanglement Distribution among Distant Nodes in a Quantum Network, Physical Review Letters, Apr. 21, 1997, pp. 3221-3224, vol. 78 No. 16, American Physical Society, College Park, USA.
H.J. Kimble, The Quantum Internet, Nature, Jun. 19, 2008, pp. 1023-1030, vol. 453, Macmillan Publishers Limited, New York, USA.
Stephanie Werner and David Elkouss and Ronald Hanson, Quantum Internet: A Vision for the Road Ahead, Science, Oct. 19, 2018, pp. 1-9, vol. 362, AAAS, Washington, DC, USA.

(Continued)

*Primary Examiner* — Hanh Phan

(57) ABSTRACT

A system includes N-distant independent plasmonic graphene waveguides. The N-distant independent plasmonic graphene waveguides are used to generate an N-partite continuous variable entangled state.

1 Claim, 12 Drawing Sheets

(56) References Cited

OTHER PUBLICATIONS

L.M. Duan, et al., Long Distance Quantum Communication with Atomic Ensembles and Linear Optics, Nature, Nov. 22, 2001, pp. 413-418, vol. 414, Macmillan Magazines Ltd, London, United Kingdom.

Koji Azuma and Kiyoshi Tamaki and Hoi-Kwong Lo, All Photonic Quantum Repeaters, Nature Communications, Apr. 15, 2015, pp. 1-7, vol. 6, Macmillan Publishers Limited, New York, USA.

Aszlo Gyongyosi and Sandor Imre, Resource Prioritization and Balancing for the Quantum Internet, Nature—Scientific Reports, Dec. 28, 2020, pp. 1-27, vol. 10, Springer Nature, London, United Kingdom.

Maximilian Ruf, et al., Quantum Networks based on Color Centers in Diamond, Journal of Applied Physics, Aug. 16, 2021, pp. 070901-1 to 070901-20, vol. 130, 070901, American Institute of Physics, College Park, USA.

C. Cabrillo, Creation of Entangled States of Distant Atoms by Interference, Physical Review A., Feb. 1999, pp. 1025-1033, vol. 59 No. 2, The American Physical Society, College Park, USA.

Morgan M. Weston, et al., Herald Quantum Steering over a High-Loss Channel, Science Advances, Jan. 5, 2018, pp. 1-6, vol. 4, AAAS, Washington DC, USA.

Aymeric Delteil, et al., Generation of Heralded Entanglement between Distant Hole Spins, Nature Physics—Letters, Dec. 21, 2015, pp. 1-7, no volume cited, Macmillan Publishers Limited, New York, USA.

Julian Hofmann, et al., Heralded Entanglement between Widely Separated Atoms, Science, Jul. 6, 2012, pp. 72-75, vol. 337, AAAS, Washington, DC, USA.

H. Bernien, et al., Heralded Entanglement between Solid-State Qubits Separated by Three Metres, Nature, Apr. 24, 2013, pp. 1-4, vol. 000, Macmillan Publishers Limited, New York USA.

Stefan Krastanov, et al., Optically Heralded Entanglement of Superconducting Systems in Quantum Networks, Physical Review Letters, Jul. 22, 2021, pp. 040503-1 to 040503-7, vol. 127, American Physical Society, College Park, USA.

Montasir Qasymeh and Hichem El Euch, Entanglement of Microwave and Optical Fields using Electric Capacitor Loaded with Plasmonic Graphene Waveguide, IEEE Photonics Journal, Feb. 27, 2020, pp. 1-13, vol. 12 No. 12, IEEE, New York, USA.

Montasir Qasymeh and Hichem El Euch, Quantum Microwave-to-Optical Conversion in Electrically Driven Multilayer Graphene, Optics Express, Mar. 4, 2019, pp. 5945-5960, vol. 27 No. 5, Optica, Washington, DC, USA.

Montasir Qasymeh and Hichem El Euch, Hybrid Two-Mode Squeezing of Microwave and Optical Fields using Optically Pumped Graphene Layers, Scientific Reports, Oct. 7, 2020, pp. 1-10, vol. 10:16676, Springer Nature, London, United Kingdom.

Rabia Tahira, et al., Entanglement of Gaussian States using a Beam Splitter, Physical Review A., Feb. 12, 2009, pp. 023816-1 to 023816-7, vol. 79, 023816, The American Physical Society, College Park, USA.

C.W. Gardiner and M.J. Collett, Input and Output in Damped Quantum Systems: Quantum Stochastic Differential Equations and the Master Equation, Physical Review A, Jun. 1985, pp. 3761-3774, vol. 31 No. 6, The American Physical Society, College Park, USA.

G. Vidal and R.F. Werner, Computable Measure of Entanglement, Physical Review A, Feb. 22, 2002, pp. 032314-1 to 032314-11, vol. 65 032314, The American Physical Society, College Park, USA.

Gerardo Adesso and Alessio Serafini and Fabrizio Illuminati, Extremal Entanglement and Mixedness in Continuous Variable Systems, Physical Review A., Aug. 24, 2004, pp. 022318-1 to 022318-18, vol. 70, 022318, The American Physical Society, College Park, USA.

F.A.S. Barbosa, et al., Disentanglement in Bipartite Continuous Variable Systems, Physical Review A, Nov. 28, 2011, pp. 052330-1 to 052330-10, vol. 84, The American Physical Society, College Park, USA.

Muhammad Asjad and Paolo Tambisi and David Vitali, Feedback Control of Two-Mode Output Entanglement and Steering in Cavity Optomechanics, Physical Review A, Nov. 10, 2016, pp. 052312-1 to 052312-10, vol. 94, The American Physical Society, College Park, USA.

Muhammad Asjad and Stefano Zippilli and Paolo Tambisi and David Vitali, Large Distance Continuous Variable Communication with Concatenated Swaps, Physica Scripta, Jul. 1, 2015, pp. 1-10, vol. 90, 074055, The Royal Swedish Academy of Sciences, Stockholm Sweden.

A. Mari and D. Vitali, Optimal Fidelity of Teleportation of Coherent States and Entanglement, Physical Review A, Dec. 31, 2008, pp. 062340-1 to 062340-9, vol. 78, The American Physical Society, College Park, USA.

* cited by examiner

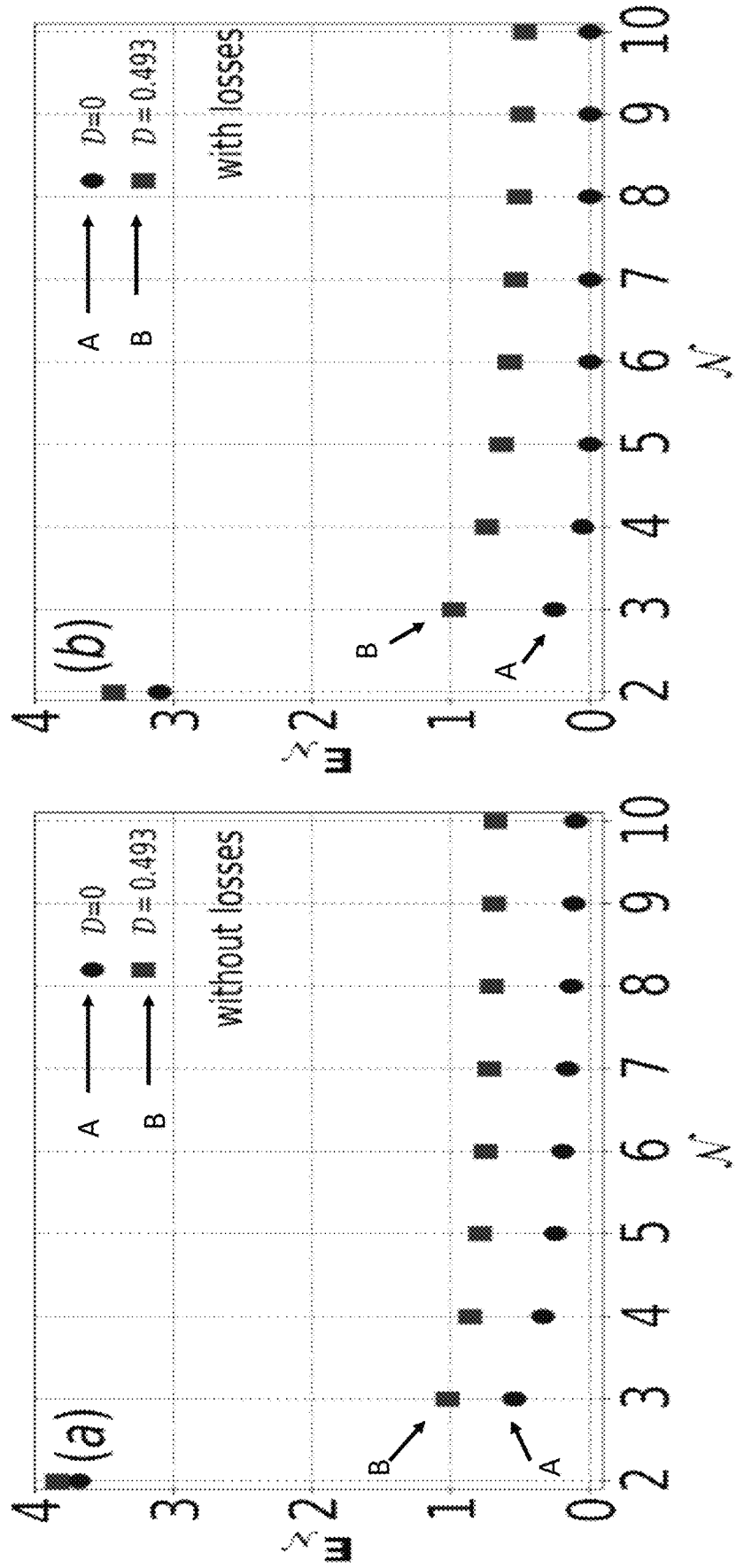

QUANTUM TELEPORTATION NETWORK USING A SYSTEM OF ELECTRONICALLY ENABLED GRAPHENE WAVEGUIDES

BACKGROUND

Entanglement has been used in a variety of applications that include quantum teleportation, satellite quantum communication, submarine quantum communication, quantum internet, quantum error correction, and quantum cryptography. Various configurations exist that can initiate entanglement, including the use of a beam splitter, two trapped ions entanglement, and entanglement of two microwave radiations. However, there is currently no system, method, or process that allows for efficient entangled states between two different radiations at different wavelengths and permits transportation of an unknown coherent state over long distances. Nor is there any such system that can be extended to a quantum optical network.

BRIEF DESCRIPTION OF DRAWINGS

FIGS. 10A and 10B are example electronically generated graphs;

DETAILED DESCRIPTION OF PREFERRED EMBODIMENTS

Figure 1:
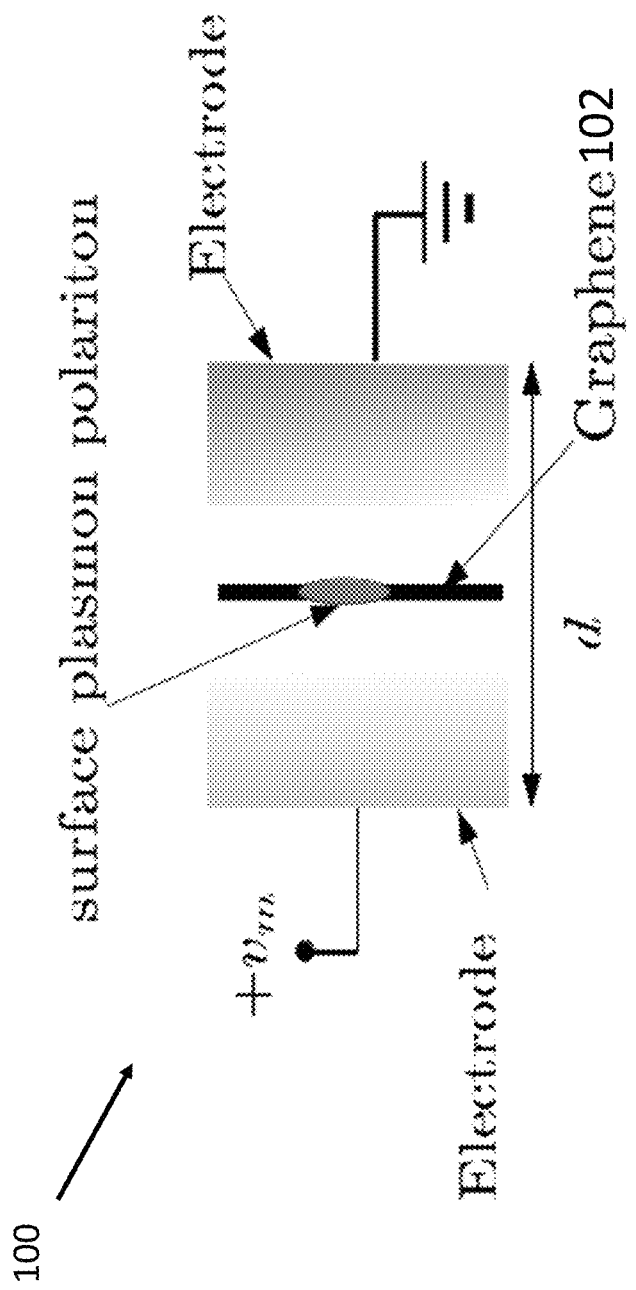
FIG. 1 is a diagram of an example model graphene structural design.

The following detailed description refers to the accompanying drawings. The same reference numbers in different drawings may identify the same or similar elements.

Systems, devices, and/or methods described herein may provide for microwave and optical entanglement using a capacitor loaded with graphene plasmonic waveguide to realize continuous variable (CV) entangled states between two different radiations at different wavelengths by using a superconducting electrical capacitor which is loaded with graphene plasmonic waveguide and driven by a microwave quantum signal. In embodiments, the interaction of the microwave mode with the two optical modes may be used for the generation of stationary entanglement between the two output optical fields. In embodiments, a resulting CV-entangled state may be used to teleport an unknown coherent state over a long distance with high efficiency. In embodiments, the stationary entanglement and the quantum teleportation fidelity are robust with respect to the thermal microwave photons that are associated with the microwave degree of freedom.

Furthermore, systems, devise, and/or methods described herein may provide for a hybrid plasmonic graphene waveguides to generate a continuous variable (CV) multipartite Gaussian Greenberger-Horne-Zeilinger (GHZ)—like entangled state between remotely connected nodes. In embodiments, the generated CV multipartite entangled states may be used to provide teleportation between connected plasmonic graphene waveguides. In such an embodiment, a configuration may incorporate N-entangled beams through N-plasmonic waveguides which are coupled via a suitable sequence of N-1 beam splitters (BSs). As a result, a state transfer may be accomplished by performing multipartite Bell measurements on N entangled beams. Accordingly, a quantum state transfer may occur in a network with a particular number of nodes connected (e.g., in a star configuration) with 10 or 100 meters ("m") separation distances by using a free space channel with an attenuation of 0.005 dB/km ("km" is for kilometers).

For such a quantum state transfer to occur, a system is described along with the governing Hamiltonian. Furthermore, as will be described further, an equation of motion is discussed and then a stationary covariance matrix that describes system stability. In addition, multipartite entanglement is discussed and then a teleportation network and numerical analysis of a transfer fidelity will be described further.

Accordingly, as described in the following figures, systems, devices, and/or methods are described for generating a continuous variable two-mode squeezed entangled state between two optical fields independent of each other in a hybrid optical-microwave plasmonic graphene waveguide system. In embodiments, two-mode squeezed entangled state between the two optical fields are used to demonstrate quantum teleportation of an unknown coherent state between two spatially distant nodes. Accordingly, as described in the following figures, achieved quantum teleportation is secure due to the fact that the fidelity, F is above the threshold $F_{thr}=2/3$. Thus, the continuous-variable entanglement (teleportation fidelity) can be controlled and enhanced through the interaction of the microwave mode with the two optical modes. In embodiments, such pairs of entangled modes, combined with the technique of entanglement swapping, can be used as a quantum channel to teleport quantum state over large distances.

FIG. 1 shows an example graphene structure design. As shown in FIG. 1, we consider a quantum microwave signal $v_m = ve^{-i\omega_m t} + c.c$ with frequency $\omega_m$ driving a superconducting capacitor 100 of capacitance $C = \epsilon\epsilon_0/d$. In embodiments, d is the distance between the two plates of the capacitor 100. In embodiments, capacitor 100 has two plates lying in the yz-plane while a single graphene layer 102 is placed at z=0. In addition to the microwave biasing, optical fields are launched to the graphene waveguide creating surface plasmon polariton modes.

In embodiments, the electrical and magnetic fields associated with a surface plasmon polariton mode of a frequency $\omega$ are given by $\vec{E} = U(z)(D_x(x)\vec{e}_x + D_z(x)\vec{e}_z)e^{-i(\omega t - \beta z)} + c.c.$ and $\vec{H} = U(z)D_y(x)\vec{e}_y e^{-i(\omega t - \beta z)} + c.c$, respectively, where U(z) is the complex amplitude, $D_i(x) = iK_i/\omega\epsilon\epsilon_0\{e^{\alpha x} f$ or $x<0$; $e^{-\alpha x}$ for $x>0,\}$ is the spatial distribution of the surface plasmon polariton mode for i=x,y,z and $K_x = \beta$ and $K_y = K_z = -i\omega\epsilon\epsilon_0$. Here $\alpha = \sqrt{\beta^2 - \epsilon\omega/c}$ and $$\beta = \omega/c\sqrt{1 - \frac{2}{Z_0\zeta}}$$

with c is the speed of light, and $Z_0$ represents the free space impedance. The graphene conductivity $\zeta$ is given by equation (1) as:

$$\zeta = \frac{iq^2}{4\pi\hbar}\ln\left(\frac{2\mu_c - W}{2\mu_c + W}\right) + \frac{iq^2 K_B T}{\pi\hbar^2 W}2\ln\left(e^{-\mu_c/K_B T} + 1\right)$$

where $W=(\omega/2\pi+i\tau^{-1})$ with $\tau$ being the scattering relaxation time, $\mu_c = \hbar V_f\sqrt{\pi n_0}\sqrt{1+2Cv_m/q\pi n_0}$ represents the chemical potential of the graphene with q is the electron charge, $n_0$ is the electron density, and $V_f$, denotes the Dirac fermions velocity.

In embodiments, an optical pump at $\omega_1$ is provided besides the two upper and lower side optical signals at $\omega_2$ and $\omega_3$, respectively. In embodiments, these optical fields are launched to the graphene layer as surface plasmon polariton modes. In embodiments, the interaction between these fields is enabled, by setting the microwave frequency equal to $\omega_m = \omega_2 - \omega_1 = \omega_1 - \omega_3$, and conducted through the electrical modulation of the graphene conductivity.

In embodiments, to model the interaction between the microwave and the optical fields, for weak driving microwave signal, we expand the chemical potential of the graphene $u_c = u'_c + v_m u''_c e^{-i\omega_m t} + c.c$ to the first order in term of $v_m$, where $u'_c = \hbar V_f\sqrt{\pi n_0}$ and $u''_c - \hbar V_f c/q\sqrt{\pi n_0}$. This expansion is obtained under the assumption of $Cv_m \ll q\pi n_0$. Then, the conductivity of the graphene in equation (1) is modified and can be written as $\zeta_c = \zeta'_c + v_m \zeta'_c e^{-i\omega_m t} + c.c$, where $\zeta'_c$ has the same value as given in equation (1) and $\zeta'_c = iq^2[W\mu''_c/\pi\hbar [(2\mu'_c)^2 - W^2\hbar^2] + K_B T\mu''_c \tan h(\mu_c/2K_B T)/WK_B T]$. Therefore, the effective permittivity of the graphene plasmonic waveguide is given by equation (2) as follow:

$$\epsilon_{eff} = \epsilon' + v\epsilon'' e^{-i\omega_m t} + c.c.$$

where $\epsilon' = (c\beta'/\omega)^2$, $\epsilon'' = 2c^2\beta'\beta''/\omega^2$ and $\beta' = \beta$. Here, $\beta'' = \beta'\zeta''_c(1-(Z_0\zeta'/2)^2)^{-1}/\zeta'_c$. Consequently, a simplified description of the interaction can be obtained by substituting the effective permittivity $\epsilon_{eff}$, from equation (2), into the governing classical Hamiltonian by equation (3) as follows:

$$H = \tfrac{1}{2}cv^2 A_r + \tfrac{1}{2}\int_{x,y,z}(\epsilon_0\epsilon_{eff}|\vec{\varepsilon}_t|^2 + \mu_0|\vec{\mathcal{H}}_t|^2)dxdydz$$

where $\vec{\varepsilon}_r = \sum_{j=1}^3 \vec{\varepsilon}_j$ is the total electric field with $\vec{\varepsilon}_j = U_j(z)(D_{xj}(x)\vec{e}_x + D_{zj}(x)\vec{e}_z)e^{-i(\omega_j t - \beta_j z)} + c.c$ (for j=1,2,3) and $\vec{\mathcal{H}}_t$ is the total magnetic field.

In embodiments, the corresponding quantized Hamiltonian that describes the three optical modes of frequencies $\omega_1$, $\omega_2$, $\omega_3$, and the microwave mode, is shown in equation (4) as follows:

$$H = \hbar\omega_m \hat{b}^\dagger \hat{b} + \hbar\sum_j \omega_j \hat{a}_j^\dagger \hat{a}_j + \hbar g_2 \hat{a}_2^\dagger \hat{a}_1 \hat{b} + \hbar g_2 \hat{a}_1^\dagger \hat{a}_2 b^\dagger + \hbar g_3 a_1^\dagger \hat{a}_3 b + \hbar g_3 a_3^\dagger \hat{a}_1 b^\dagger$$

where $\hat{a}_j = U\sqrt{\xi_0 \epsilon'_{eff} V_L/\hbar\omega_j}$ is the annihilation operator of the j-th optical mode, $\hat{b} = v\sqrt{CA_r/2\hbar\omega_m}$ is the annihilation operator of the microwave mode, $V_L = A_r\int(|D_{xj}|^2 + |D_{zj}|^2)dx$ and $$\xi_j = \frac{1}{2} + \frac{A_r u_0 \int |D_{yj}|^2 dx}{2V_L \epsilon_0 \epsilon_{eff}}.$$

Here, $g_j$ describes the coupling strength of the microwave mode b with the j-th optical mode, given by equation (5) as follows:

$$g_j = \frac{\epsilon''_{1j} l_{1j}}{2\sqrt{\xi_1\xi_j}}\sqrt{\frac{2\omega_1\omega_j\hbar\omega_m}{CA_r\epsilon'_1\epsilon'_j}}\sin(\theta_j)e^{i\theta_j}$$

where $\theta_j = (-1)^i(\beta_1 - (-1)^i\beta_j)L/2$ and $$l_{mn} = \frac{\int(D^*_{xm}D_{xn} + D^*_{zm}D_{zn})dx}{\sqrt{\int(|D_{xm}|^2 + |D_{zm}|^2)dx \int(|D_{xn}|^2 + |D_{zn}|^2)dx}}.$$

In embodiments, the surface plasmon polariton mode at frequency $\omega_1$ is strong and therefore can be treated classically. By considering a rotating frame at frequency $\omega_j$ (for j=2,3,b), and introducing the corresponding noise terms, the Heisenberg-Langevin equations of the microwave and optical operators read as equations (6a), (6b), and (6c) as follows:

$$\dot{\hat{b}} = -\gamma_m \hat{b} - i\mathcal{G}_2 \hat{a}_{2-i}\mathcal{G}_3 \hat{a}_3^\dagger + \sqrt{2\gamma_m}\hat{b}_{in}$$

$$\dot{\hat{a}}_2 = -\gamma_2 \hat{a}_2 - i\mathcal{G}_2\hat{b} + \sqrt{2\gamma_2}\hat{a}_{in_2}$$

$$\dot{\hat{a}}_3 = -\gamma_3 \hat{a}_3 - i\mathcal{G}_3 \hat{b}^\dagger + \sqrt{2\gamma_3}\hat{a}_{in_3}$$

where $\gamma_m$ represents the damping rate of the microwave mode, and $\gamma_j$ is the decay rate of the j-th optical mode. Here $\mathcal{G}_2 = \bar{a}_1 g_2$ and $\mathcal{G}_3 = \bar{a}_1 g_3$ denote the effective coupling rates, where $\bar{a}_1$ being the classical amplitude. The operators $\hat{a}_{in_j}$ and $\hat{b}_{in}$ are the zero-average input noise operators for the j-th optical mode and the microwave mode, respectively, and can be characterized by $\langle \hat{a}_{in_j}^\dagger(t), \hat{a}_{in_{j'}}(t')\rangle + n_j\delta_{j,j'}\delta(t-t')$ and $\langle \hat{b}_{in}^\dagger, \hat{b}_{in}\rangle = n_b\delta(t-t')$.

In embodiments, the mean thermal populations of the j-th optical mode and the microwave mode are given by $n_j = (e^{\hbar\omega_j/K_B T}-1)^{-1}$ and $n_b = (e^{\hbar\omega_j/K_B T}-1)^{-1}$ respectively, where $K_B$ is the Boltzmann constant. The optical thermal photon number can be assumed $n_j \approx 0$ because of $\hbar\omega_j/K_B T > 0$, whereas the microwave thermal photon number $n_m$ is significant and cannot be conceived identical to zero even at a very low temperature. In embodiments, the two field operators $\hat{a}_2$ and $\hat{a}_3$ are rewritten in term of the Bogolyubov operators $\hat{A}_2 = \hat{a}_3 \cos hr + \hat{a}_2^\dagger \sin hr$ and $\hat{A}_3 = \hat{a}_2 \cos hr + \hat{a}_3^\dagger \sin hr$, where $\cos hr = \mathcal{G}_2/\mathcal{G}$, $\sin hr = \mathcal{G}_3/\mathcal{G}$ with $\mathcal{G} = \sqrt{\mathcal{G}_2^2 - \mathcal{G}_3^2}$. It then follows that the motion equations in equations (6a), (6b), and (6c) can be presented in term of the Bogolyubov modes, given by equations (7a), (7b), and (7c):

$$\dot{\hat{b}} = -\gamma_m \hat{b} i\mathcal{G}\hat{A}_3 + \sqrt{2\gamma_m}\hat{b}_{in}$$

$$\dot{\hat{A}}_2 = -\gamma_2 \hat{A}_2 + \sqrt{2\gamma_2}\hat{A}_{in,2}$$

$$\dot{\hat{A}}_3 = -\gamma_3 \hat{A}_3 - i\mathcal{G}\hat{b} + \sqrt{2\gamma_3}\hat{A}_{in,3}$$

where $\hat{A}_{in,2} = \alpha_{in,3}\cos hr + \hat{a}_{in,2}^\dagger \sin hr$ and $\hat{A}_{in,3} = \alpha_{in,2}\cos hr$. It can be inferred from the above set of equations that the considered modes of the two optical fields are entangled.

Now we consider the problem of entanglement between the outgoing light fields of the optical modes $\hat{a}_2$ and $\hat{a}_3$. According to the input-output theory, the output fields operators $\hat{a}_{out2}$ and $\hat{a}_{out3}$ are related to the two cavity operators $\hat{a}_2$ and $\hat{a}_3$ by $\hat{a}_{out2}(t) = \sqrt{\gamma_2}\hat{a}_2(t) - \hat{a}_{in2}(t)$ and $\hat{a}_{out3}(t) = \sqrt{\gamma_3}\hat{a}_3(t) - \hat{a}_{in3}(t)$ respectively. To study the stationary entanglement between the output optical modes specified by their central frequencies $\omega_2$ and $\omega_3$, we define temporal filtered modes of the output fields in term of the filter functions $\mathcal{F}_{\alpha_2}(t)$ and $\mathcal{F}_{\alpha_3}(t)$, as in the following equations 8(a) and 8(b):

$$\hat{a}_{\mathcal{F},out_2}(t)=\int_{-\infty}^{t}\mathcal{F}_{a_2}(t-\tau_2)\hat{a}_{out2}(t')d\tau \quad (8a)$$

$$\hat{a}_{\mathcal{F},out_3}(t)=\int_{-\infty}^{t}\mathcal{F}_{a_3}(t-\tau_3)\hat{a}_{out3}(t')d\tau \quad (8b)$$

where $\hat{a}_{\mathcal{F},out_2}(t)$ and $\hat{a}_{\mathcal{F},out_3}(t)$ are the filtered causal bosonic annihilation operators for the output optical modes $\hat{a}_{out2}$ and $\hat{a}_{out3}$, respectively, $$\mathcal{F}_i(t) = \sqrt{2/\tau_i}\, e^{-\left(\frac{1}{\tau_i}+i\Omega_i\right)t}\theta(t)(i=2,3)$$

is the filter function multiplied by the Heaviside step function, $\Omega_i$ represents the central frequency, and $1/\tau_i$ is the bandwidth of the i-th filter. It is convenient to rewrite equations 6(a), 6(b), and 6(c) in the following compact matrix form in equation (9) as follows:

$$\frac{d}{dt}R(t) = AR(t) + DR_{in}(t)$$

where $R^T6=\{\hat{a}_2, \hat{a}_2^\dagger, \hat{a}_3, \hat{a}_3^\dagger, \hat{b}, \hat{b}^\dagger\}$ is the column vector of the field operators, $R_{in}^T=\{\hat{a}_{in,2},\hat{a}_{in,2}^\dagger, \hat{a}_{in,3}, \hat{a}_{in,3}^\dagger, \hat{b}_{in}, \hat{b}_{in}^\dagger\}$ is the column vector of the corresponding noise operators, and the superscript T indicating transposition. In embodiments, A is the drift matrix with elements that can be easily obtained from the Langevin equations set in equations 6(a), 6(b), and 6(c), D is the coefficients matrix of the corresponding input noise operators. In embodiments, for a drift matrix A with eigenvalues in the left half of the complex plane, the interaction is stable and reaching the steady state. The solution can be obtained in the frequency domain, by applying Fourier transform to equations 8(a),8(b) and (9), given by equation (10) as follows:

$$R_{out}(\omega)=[F(\omega)M(\omega)D-\nu(\omega)]R_{in}$$

where $R_{out}^T(\omega)=\{\hat{a}_{\mathcal{F},out_2}(\omega), \hat{a}_{\mathcal{F},out_2}^\dagger(\omega), \hat{a}_{\mathcal{F},out_3}(\omega), \hat{a}_{\mathcal{F},out_3}^\dagger(\omega), \hat{b}(\omega), \hat{b}^\dagger(\omega)\}$, $R_{in}(\omega)$ is the Fourier transform of $R_{in}(t)$, $M(\omega)=[A-i\omega]^{-1}$, $F(\omega)=\text{diag}\{\sqrt{2\gamma_2}\mathcal{F}_2(\omega), \sqrt{2\gamma_2}\mathcal{F}^*_2(-\omega), \sqrt{2\gamma_3}\mathcal{F}_3(\omega), \sqrt{2\gamma_3}\mathcal{F}_{3*(\omega)}, 1, 1\}$ is the matrix of the filter functions, $\nu=\text{diag}\{\mathcal{F}_2(\omega), \mathcal{F}^*_2(-\omega), \mathcal{F}_3(\omega), \mathcal{F}^*_3(-\omega), 1, 1\}$, and $\mathcal{F}_i(\omega)$ is the Fourier transform of $\mathcal{F}_i(t)$.

Given that the operators of the quantum input noise are Gaussian, the steady-state of the system is completely described by first and second-order moments of the output field operators. In particular, it is convenient to introduce the quadratures $\hat{X}_{\mathcal{F},out_2}=(\hat{a}_{\mathcal{F},out_2}+\hat{a}_{\mathcal{F}out_2}^\dagger)/\sqrt{2}$, $\hat{Y}_{\mathcal{F}out_2}=(\hat{a}_{\mathcal{F}out_2}-\hat{a}_{\mathcal{F}out_2}^\dagger)/\sqrt{2i}$, $\hat{X}_{\mathcal{F}out_3}=(\hat{a}_{\mathcal{F}out_3}+\hat{a}_{\mathcal{F}out_3}^\dagger)/\sqrt{2}\hat{Y}_{\mathcal{F}out_3}+(\hat{a}_{\mathcal{F}out_3}-\hat{a}_{\mathcal{F}out}^\dagger)/\sqrt{2i}\hat{X}_b=(\hat{b}+\hat{b}^\dagger)/\sqrt{2}$ and $\hat{Y}_b=(\hat{b}-\hat{b}^\dagger)/\sqrt{2i}$.

In embodiments, the correlation matrix (CM) V of the system is defined as $V_{ij}=\langle u_i u_j+u_j u_i\rangle/2$ where $u^T=\{\hat{X}_{\mathcal{F},out_2}, \hat{Y}_{\mathcal{F},out_2}, \hat{X}_{\mathcal{F},out_3}, \hat{X}_{\mathcal{F},out_3}, \hat{X}_b, \hat{Y}_b\}$ is the vector of the quadrature's for the filtered output modes. From equation (10), the stationary solution for the covariance matrix V of the filter output modes can be obtained by equation (11) as follows:

$$V=\int_{-\infty}^{\infty} QT(\omega)NT(-\omega)^T Q^T dw$$

where $Q=\text{diag}\{Q, Q_3, Q_b\}$, $$Q_j = \frac{1}{\sqrt{2}}\begin{pmatrix} 1 & 1 \\ i & -i \end{pmatrix},$$

$T(\omega)=F(\omega)M(\omega)D-\nu(\omega)$ and $N=\text{diag}\{N_2, N_3, N_b\}$ is the diffusion matrix. Here, $$N_b = \begin{pmatrix} 0 & n_m+1 \\ n_m & 0 \end{pmatrix},$$

and $N_j$ stands for 2×2 matrix of $\{N_j\}_{12}=1$ (for j=2,3) while all other elements are being zero.

In embodiments, the generation of stationary output entanglement between the two optical modes $\hat{a}_{\mathcal{F}out_2}$ and $\hat{a}_{\mathcal{F}out_3}$ is considered. In embodiments, the covariance matrix can be introduced as in the following block form, in equation (12) as follows:

$$v = \begin{pmatrix} v_{a2} & v_{a23} \\ v_{a23}^T & v_{a3} \end{pmatrix}$$

with $v_{a2}$ and $v_{a3}$ are 2×2 covariance matrices for the two ouput optical $\hat{a}_{out_2}$ and $\hat{a}_{out_3}$ modes, respectively. The correlation between $\hat{a}_{out_2}$ and $\hat{a}_{out_3}$ can be described by the 2×2 $v_{a23}$ matrix.

The stationary entanglement between Alice's (mode $\hat{a}_{out_2}$) and Bob's (mode $\hat{a}_{out_3}$) can be measured by the negativity (i.e., quantified by the logarithmic negativity in equation (13) as follows:

$$E_N=\max[0,-\ln 2\eta^-]$$

where $$\eta^- = 2^{-1/2}\sqrt{\sum^2(v) - \sqrt{\sum^2(v) - 4\det(v)}}$$

is the smallest symplectic eigenvalue of the partially transposed 4×4 covariance matrix (CM)$v$ with $\Sigma(v)=\det(V_{a_2})+\det(V_{a_3})-2\det(V_{a_{23}})$. A non-zero value of $E_N$ quantifies the degree of entanglement between Alice's and Bob's modes.

In embodiments, having a zero-bandwidth means that $1/\tau_j \to 0$. Therefore, the two-mode entanglement becomes independent of $\Omega_j$.

Figure 2A:
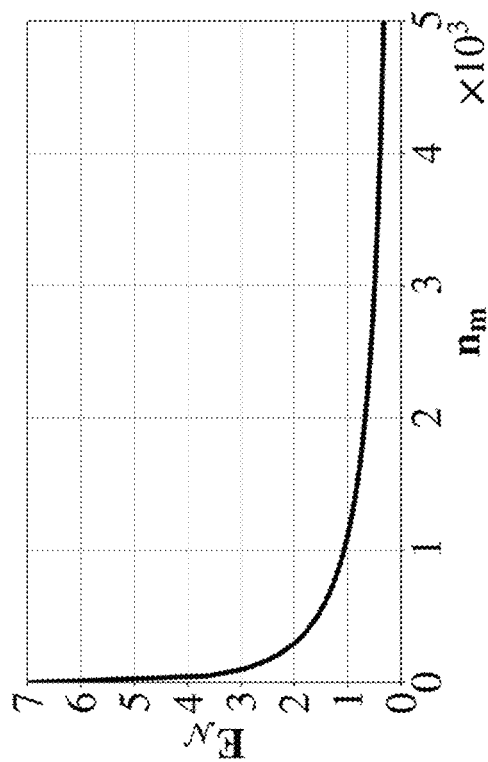
FIGS. 2A and 2B are example electronically generated graphs.
Figure 2B:
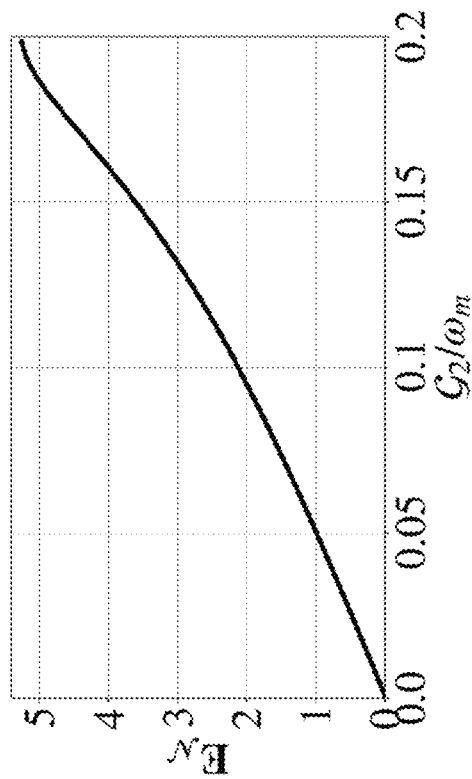

FIGS. 2A and 2B show example electronically generated graphs. As shown in FIGS. 2A and 2B, the Logarithmic negativity $E_N$ is plotted to quantify the entanglement between the output modes against the effective coupling $\mathcal{G}_2$ and the microwave thermal photon $n_m$. In FIG. 2A, $E_N$ is plotted as a function of the parameter $\mathcal{G}_2\omega_m$, while the coupling $\mathcal{G}_3$ is fixed at $\mathcal{G}_3=0.2\omega_m$. In embodiments, the maximum value of entanglement between the two output optical modes is achieved when the two couplings fulfill the condition $\mathcal{G}_2\approx\mathcal{G}_3$. This can be explained by noting that the squeezing parameter r in equation (7), which is defined as the ratio of $\mathcal{G}_3$ and $\mathcal{G}_2$ couplings, is approaching one (r=$\mathcal{G}_3/\mathcal{G}_2\approx1$) at this condition. In FIG. 2(b), we also study the robustness of the steady state entanglement between the two optical modes $\hat{a}_{out,2}$ and $\hat{a}_{out,3}$ as function of the microwave thermal population $n_m$ at the optimal condition of $\mathcal{G}_2\approx\mathcal{G}_3$.

In embodiments, as shown in FIG. 2B, the proposed entanglement is robust against the microwave thermal population. In embodiments, the condition $\mathcal{G}_2 \approx \mathcal{G}_3$ can be obtained by controlling the graphene properties including the doping concentration and the layer dimensions. Thus, the two optical output modes possess Einstein-Podolsky-Rosen (EPR) correlations which is optimized for r≈1 and can be immediately exploited for quantum teleportation.

Figure 3:
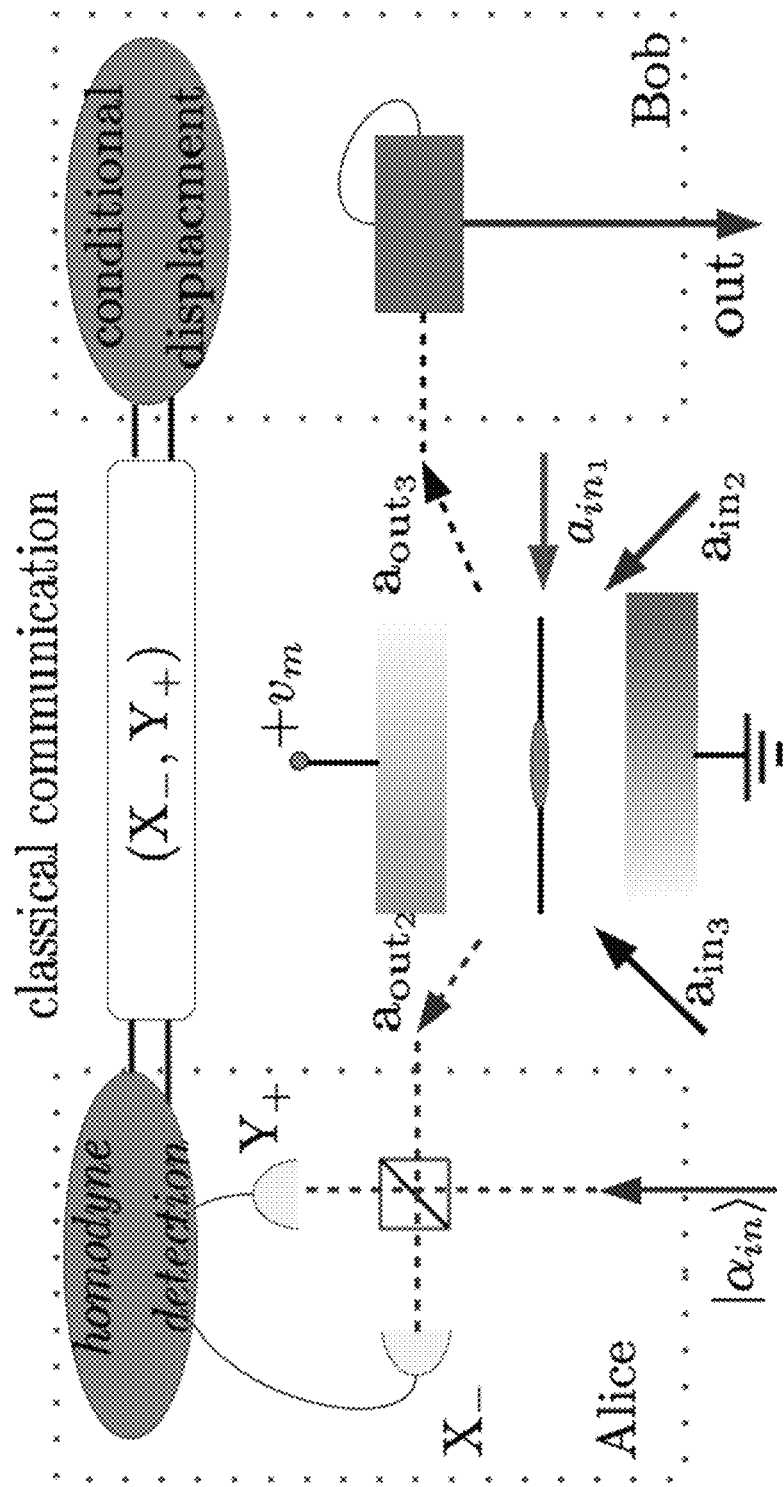
FIG. 3 is an example quantum teleportation system.

In embodiments, the EPR-like continuous variable entanglement generated between the two output fields can be characterized in term of its effectiveness as a quantum channel for quantum teleportation. In embodiments, the performance of the quantum channel can be realized in term of the teleportation fidelity of an unknown coherent state between two distant nodes labeled as Alice and Bob, as shown in FIG. 3. The two-output optical fields $\hat{a}_{out_2}$ and $\hat{a}_{out_3}$ possess EPR correlations and are propagating to Alice and Bob, respectively. Then, Alice combines an unknown input coherent state $|\alpha_{in}\rangle$ to be teleported with the part of the entangled state on a beam splitter and measures the two quadrature's. $1/\sqrt{2}(\hat{X}_{in} - \hat{X}_{out,2})$ and $1/i\sqrt{2}(\hat{Y}_{in} + \sqrt{Y}_{out_3})$, where $\alpha_{in} = (\hat{X}_{in} + i\hat{Y}_{in})/\sqrt{2}$. The measurement outcomes are sent to Bob.

Then Bob displaces his mode according to the measurement outcome. In embodiments, the standard two-mode teleportation between Alice and Bob, the teleportation fidelity is given by:

$$F = \frac{1}{\sqrt{\det \Gamma}},$$

$$\Gamma = 2V_{in} + \mathcal{Z} V_{a2} \mathcal{Z} + V_{a3} - \mathcal{Z} V_{a23} - V_{a23}^T \mathcal{Z},$$

where Z=diag (1,−1) and $V_{in}=\frac{1}{2}\text{diag}(1,1)$ is the covariance matrix of the input coherent state. Moreover, the upper bound set by the entanglement on the fidelity of the CV teleportation, and optimized over the local operations, is given by equation (14) as follows:

$$F^{opt} = \frac{1}{1 + \exp^{-E_N}}$$

where $E_N$ is the logarithmic negativity of the two-mode entanglement shared between Alice and Bob.

Figure 4A:
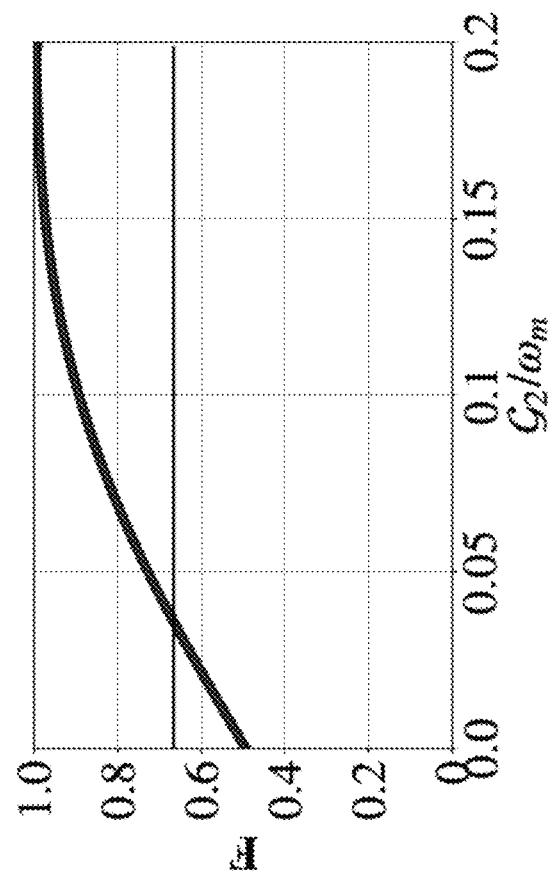
FIGS. 4A and 4B are example electronically generated graphs.
Figure 4B:
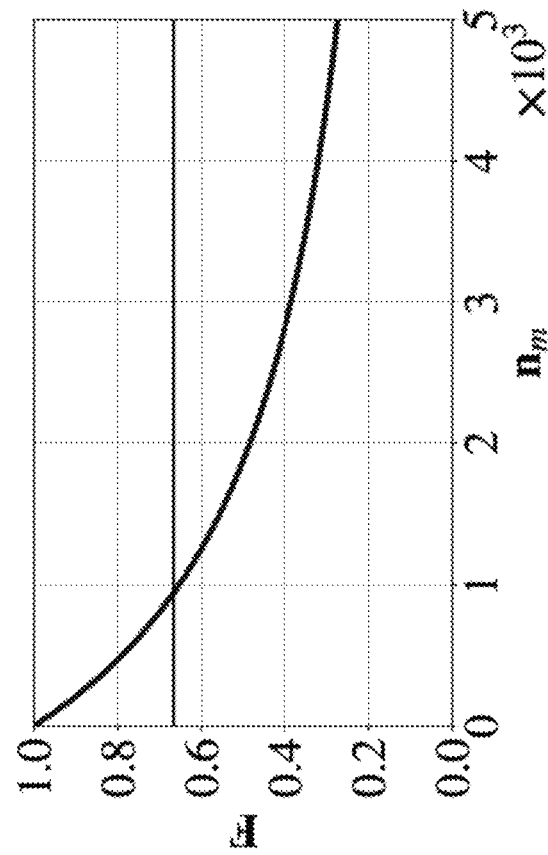

In embodiments, the corresponding quantum teleportation of an unknown optical coherent state using the obtained squeezed-state entanglement is shown in FIGS. 4A and 4B. As shown in FIG. 4A, the teleportation fidelity is plotted for a coherent state as function of the effective coupling $\mathcal{G}_2$, considering the microwave thermal population $n_m=10$ and having the coupling $\mathcal{G}_3 \approx 0.2\omega_m$. In embodiments, it can be seen from FIG. 4A that the maximum value of the fidelity (blue curve) is achieved when $\mathcal{G}_2 \approx \mathcal{G}_3 \approx 0.2\omega_m$. In embodiments, this is the same condition obtained for the optimal entanglement shown in FIG. 2A.

In embodiments, the maximum value of the fidelity adheres the upper bound, defined in equation (14). As shown in FIG. 4B the teleportation fidelity is analyzed for an unknown coherent state as function of the microwave thermal excitation $n_m$ while considering $\mathcal{G}_3 \approx \mathcal{G}_2 \approx 0.2\omega_m$. In embodiments, it is found that the proposed teleportation is very robust against the microwave thermal population. For example, the teleportation fidelity is above ⅔ even for $n_m=1000$. This is a realization of quantum teleportation of an unknown coherent state $|\alpha\rangle$ entering the device as Alice wants to teleport to Bob. In embodiments, to achieve secure quantum teleportation of coherent state, a fidelity greater than a threshold fidelity $F_{thr}=\frac{2}{3}$ is required, which is impossible to reach without the use of entanglement.

Figure 5:
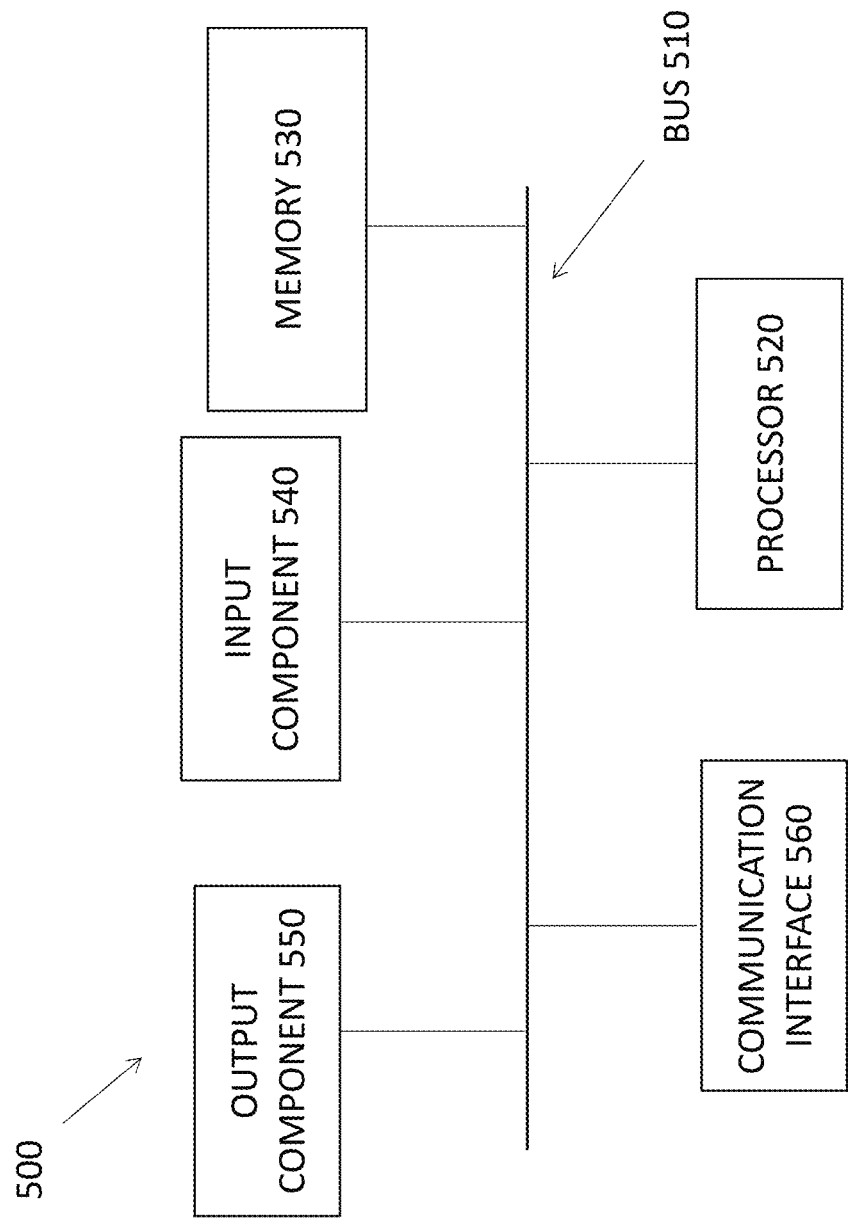
FIGS. 5 and 6 are example computing devices.

FIG. 5 is a diagram of example components of a device 500. Device 500 may correspond to a computing device, such as devices 600 and/or 610. Alternatively, or additionally, device 600 may include one or more devices 500 and/or one or more components of device 500.

As shown in FIG. 5, device 500 may include a bus 510, a processor 520, a memory 530, an input component 540, an output component 550, and a communications interface 560. In other implementations, device 500 may contain fewer components, additional components, different components, or differently arranged components than depicted in FIG. 5. Additionally, or alternatively, one or more components of device 500 may perform one or more tasks described as being performed by one or more other components of device 500.

Bus 510 may include a path that permits communications among the components of device 500. Processor 520 may include one or more processors, microprocessors, or processing logic (e.g., a field programmable gate array (FPGA) or an application specific integrated circuit (ASIC)) that interprets and executes instructions. Memory 530 may include any type of dynamic storage device that stores information and instructions, for execution by processor 520, and/or any type of non-volatile storage device that stores information for use by processor 520. Input component 540 may include a mechanism that permits a user to input information to device 500, such as a keyboard, a keypad, a button, a switch, voice command, etc. Output component 550 may include a mechanism that outputs information to the user, such as a display, a speaker, one or more light emitting diodes (LEDs), etc.

Communications interface 560 may include any transceiver-like mechanism that enables device 500 to communicate with other devices and/or systems. For example, communications interface 560 may include an Ethernet interface, an optical interface, a coaxial interface, a wireless interface, or the like.

In another implementation, communications interface 560 may include, for example, a transmitter that may convert baseband signals from processor 520 to radio frequency (RF) signals and/or a receiver that may convert RF signals to baseband signals. Alternatively, communications interface 560 may include a transceiver to perform functions of both a transmitter and a receiver of wireless communications (e.g., radio frequency, infrared, visual optics, etc.), wired communications (e.g., conductive wire, twisted pair cable, coaxial cable, transmission line, fiber optic cable, waveguide, etc.), or a combination of wireless and wired communications.

Communications interface 560 may connect to an antenna assembly (not shown in FIG. 5) for transmission and/or reception of the RF signals. The antenna assembly may include one or more antennas to transmit and/or receive RF signals over the air. The antenna assembly may, for example, receive RF signals from communications interface 560 and transmit the RF signals over the air, and receive RF signals over the air and provide the RF signals to communications interface 560. In one implementation, for example, communications interface 560 may communicate with a network (e.g., a wireless network, wired network, Internet, etc.).

As will be described in detail below, device 500 may perform certain operations. Device 500 may perform these operations in response to processor 520 executing software instructions (e.g., computer program(s)) contained in a computer-readable medium, such as memory 530, a secondary storage device (e.g., hard disk, CD-ROM, etc.), or other forms of RAM or ROM. A computer-readable medium may be defined as a non-transitory memory device. A memory device may include space within a single physical memory device or spread across multiple physical memory devices. The software instructions may be read into memory 530 from another computer-readable medium or from another device. The software instructions contained in memory 530 may cause processor 520 to perform processes described herein. Alternatively, hardwired circuitry may be used in place of or in combination with software instructions to implement processes described herein. Thus, implementations described herein are not limited to any specific combination of hardware circuitry and software.

Figure 6:
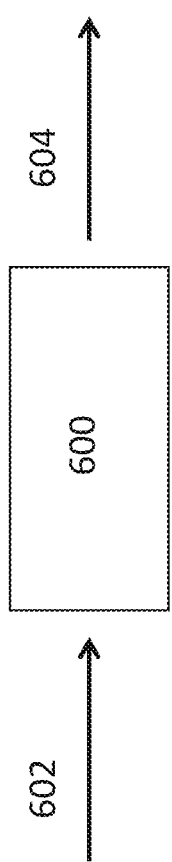

FIG. 6 is an example diagram. FIG. 6 describes device 600, communication 602, and communication 604. In embodiments, device 600 may a computing device with features/structures similar to that described in FIG. 5. In embodiments, device 600 may be a computing device that is part of a laptop, desktop, tablet, smartphone, and/or any other device that may receive communication 602, analyze communication 602, and generate output 604 based on communication 602. As shown in FIG. 6, communication 602 may be received by device 600 (e.g., via keyboard inputs, touchscreen inputs, voice inputs, etc.). In embodiments, communication 602 may include information about microwave signals, optical signals, and/or any other information.

In embodiments, device 600 may receive communication 602 and, based on one or more of equations (1) to (30), as described above, that generate output 604 that includes information about nodes, microwave signals, optical signals, and/or other information associated with equations (1) to (30).

Figure 7:
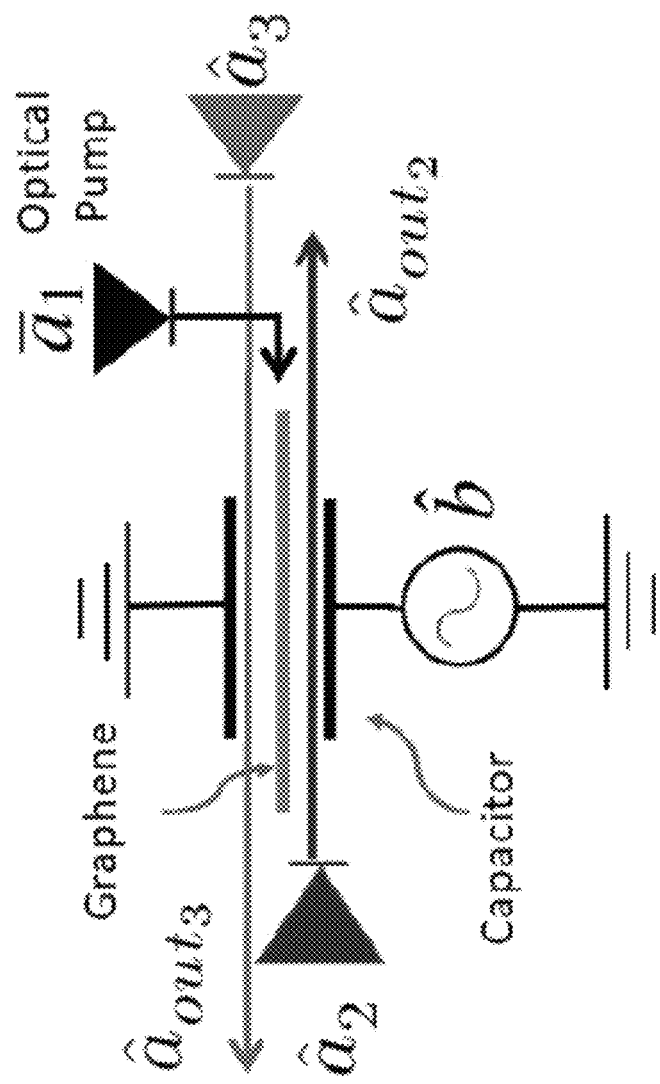
FIG. 7 is a diagram of an example graphene load capacitor.

FIG. 7 is an example graphene load capacitor. As shown in FIG. 7, the graphene load capacitor consists of a graphene plasmonic waveguide integrated with a parallel-plate electrical capacitor which allows for a coupling of two interacting quantum optical fields (e.g., the annihilation operators $\widehat{a_2}$ and $\widehat{a_3}$, and frequencies $\omega_1$ and $\omega_2$) that act as counter copropagating surface plasmon polariton (SPP) modes along the graphene layer. As shown in FIG. 7, a microwave voltage (corresponding to annihilation operator b and frequency $\omega_m$) drives the shown capacitor and causing the interaction process by electrically perturbing the graphene conductivity. In embodiments, any losses are compensated by launching a copropagating intense SSP optical pump (with an amplitude $\overline{a_1}$ and frequency $\omega_1$. In embodiments, the interaction process occurs by setting $\omega_m = \omega_3 - \omega_1 = \omega_1 - \omega_2$.

Figure 8:
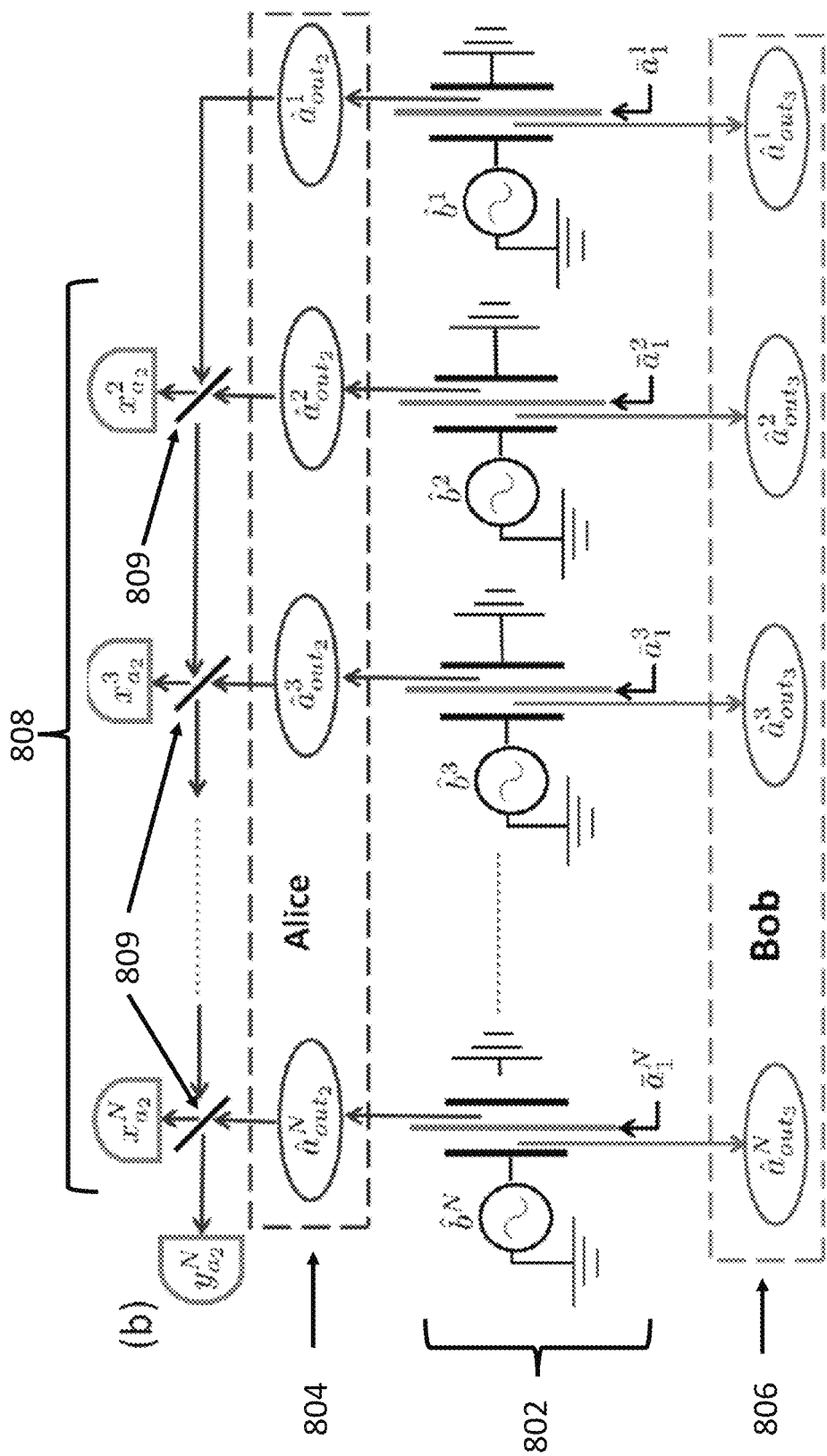
FIG. 8 is a diagram of an example array of independent chains of plasmonic graphene-loaded capacitors.

FIG. 8 is a diagram of an example array of independent chains of plasmonic graphene-loaded capacitors (as shown as 802 in FIG. 8). In embodiments, the free Hamiltonian of the system is given by equation (15):

$$H_0 = \sum_j^N \omega_m^j b^{j\dagger} b + \omega_1^j a_1^{j\dagger} a_1^j + \omega_2^j a_2^{j\dagger} a_2^j + \omega_3^j a_3^{j\dagger} a_3^j$$

In embodiments, for equation (15) $j \in \{1, 2, 3, \ldots N\}$ and $\omega_m^j = \omega_2^j - \omega_2^j = \omega_1^j \omega_3^j$ is satisfied for every j-th element. In embodiments, the interaction is also described by equation (16):

$$H_1 = \sum_j^\omega g_2^j(a_2^{j\dagger} a_1^j b^j + a_1^{j\dagger} a_2^j b^{j\dagger}) + g_3^j(a_1^{j\dagger} a_3^j b^j + a^{j\dagger_3} a_1^j b^{j\dagger})$$

In embodiments, $g_{2,3}{}^j$ describes the perturbation coupling coefficients.

In embodiments, SPP modes with amplitudes $a_1^{-j}$ at a frequency $\omega_1$ are considered intense and can be treated classically. In embodiments, the Hamiltonians described in equations (15) and (16) can be used to generate equations of motion for the microwave and SPP modes of the j-th element within the context of open system dynamics under the Heisenberg-Langevin formalism as given in equations 17(a), 17(b), and 17(c), respectively:

$$\dot{b}^j = \gamma_m^j b^j - \mathcal{G}_2^j - i\mathcal{G}_3^j \hat{a}_3^{j\dagger} + \sqrt{2\gamma_m^j} \hat{b}_{in}^j$$

$$\dot{\hat{a}}_2^j = -\gamma_2^j \hat{a}_2^j - i\mathcal{G}_2^j \hat{b}^j + \sqrt{2\gamma_2^j} \hat{a}_{in_2}^j$$

$$\dot{\hat{a}}_3^j = -\gamma_3^j \hat{a}_3^j - i\mathcal{G}_3^j \hat{b}^{j\dagger} + \sqrt{2\gamma_3^j} \hat{a}_{in_3}^j$$

In embodiments, $\mathcal{G}_2^j = \overline{a}_1^j g_2^j (\mathcal{G}_3^j = \overline{a}_1^j g_3^j)$, and $\gamma_m, \gamma_2^j$ and $\gamma_3^j$ are decay rates of the microwave and SPP modes respectively.

In embodiments, $\hat{a}_{in_2}{}^j$ and $\hat{a}_{in_3}{}^j$ are input noise operators that are characterized by $\langle \hat{a}_{in_2}(t) \hat{a}_{in_2}{}^\dagger(t') \rangle = \delta(t-t')$ and $\langle \hat{a}_{in_3}(t) \hat{b}_{in}{}^j(t') \rangle = \delta(t-t')$, respectively. In embodiments, equations 17(a), 17(b), and 17(c) are obtained for a rotating frame at $\omega_m, \omega_2, \omega_3$. In addition, a nonclassical driving microwave mode is considered with a noise operator $b_{in}{}^j$ and characterized by $\langle \hat{b}_{in}{}^j(t) \hat{b}_{in}{}^j(t') \rangle = M^j \exp^{i\phi} \delta(t-t')$ and $\langle \hat{b}_{in}{}^j(t) \hat{b}_{in}{}^{j\dagger}(t') \rangle = (N^j+1)\delta(t-t')$. In embodiments, $M^j$ and $N^j$ may be expressed in terms of purity, $P^j$ and nonclassicality depth $D^j$ as shown in equations (18) and (19), respectively:

$$M^j = \frac{1}{4P^{j^2}(1-2D^j)} - \frac{1-2D^j}{4}$$

$$N^j = \frac{1}{4P^{j^2}(1-2D^j)} + \frac{1-2D^j}{4}$$

In embodiments, all microwave modes may have the same purity $P^j = P$ and nonclassicality depth $D^j = D$. In embodiments, and in accordance with input-output theory, the output field operators ($\hat{a}_{out_2}{}^j$ and $\hat{a}_{out_3}{}^j$) are related to corresponding input operators ($\hat{a}_2{}^j$ and $\hat{a}_3{}^j$) by $\hat{a}_{out_2}{}^j(t) = \sqrt{\gamma_2^j} \hat{a}_2{}'(t) - \hat{a}a_{in_2}{}^j(t)$ and $\hat{a}_{out_3}{}^j(t) = \sqrt{\gamma_3^j} \hat{a}_3{}'(t) - \hat{a}_{in_3}{}^j(t)$, respectively. Thus, a density matrix $\hat{\rho}_{a2a3}{}^{out}$ of the output field modes, $\hat{a}_{F,out_2}(t) = (\hat{a}_{out_2}{}^1(t), \hat{a}_{out_2}{}^2(t), \ldots, \hat{a}_{out_2}{}^N(t))$ (which for this example are named as Alice modes and shown in FIG. 8 as 804), and $\hat{a}_{out_3}(t) = (\hat{a}_{out_3}{}^1(t), \hat{a}_{out_3}{}^2(t), \ldots, \hat{a}_{out_3}{}^N(t))$ (which for this example are named as Bob modes and shown in FIG. 8 as 806) can be expressed as $\hat{\rho}_{a_2,a_3}{}^{out} = \hat{\rho}_{a_2,a_3}{}^{1,out} \otimes \hat{\rho}_{a_2,a_3}{}^{2,out}, \ldots, \otimes \hat{\rho}_{a_2,a_3}{}^{N,out}$ as shown in equation (20):

$$\hat{\rho}_{a_2a_3}{}^{j,out} = \int \chi_j(\epsilon_{a_2}{}^j, \epsilon_{a_3}{}^j) \mathcal{D}(\epsilon_{a_2}{}^j) \otimes \mathcal{D}^\dagger(\epsilon_{a_3}{}^j) d^2\epsilon_{a_2}{}^j d^2\epsilon_{a_3}{}^j$$

In embodiments, $\mathcal{D}(\varepsilon_{a_2}^j)=\exp(\varepsilon_{a_2}^j\hat{a}_{out_2}^{j\dagger}-\varepsilon_{a_2}^{j*}a_{out_2}^j)$ and $\mathcal{D}(\varepsilon_{a_3}^j)=\exp(\varepsilon_{a_3}^j\hat{a}_{out_3}^{j\dagger}-\varepsilon_{a_3}^{j*}a_{out_3}^j)$ may be displacement operators for the j-th Alice and Bob modes, respectively, for this non-limiting example. In embodiments, $\varepsilon_{a_2}^j=(x_{a_2}^j+iy_{a_2}^j)/\sqrt{2}$ and $\varepsilon_{a_3}^j=(x_{a_3}^j+iy_{a_3}^j)/\sqrt{2}$ correspond to the bosonic operators $\hat{a}_{out_2}^j=(\hat{x}_{a_2}^j+i\hat{y}_{a_2}^j)/\sqrt{2}$ and $\hat{a}_{out_3}^j=(\hat{x}_{a_3}^j+i\hat{y})/\sqrt{2}$, respectively. In embodiments, $x_{a_2}^j(x_{a_3}^j)$ is a counterpart of the Hermitian quadrature operator $\hat{x}_{a_2}^j(\hat{x}_{a_3}^j)$, and $\mathcal{Y}_{a_2}^j(\mathcal{Y}_{a_3}^j)$ is a counterpart of the Hermitian quadrature operator $\hat{y}_{a_2}^j(\hat{y}_{a_3}^j)$.

In embodiments, $X(\varepsilon_{a_2}, \varepsilon_{a_3})$ is a characteristic function that is a Fourier Transform of the Wigner function—$X(\varepsilon_{a_2}, \varepsilon_{a_3})=\mathcal{F}[W((\varepsilon_{a_2}, \varepsilon_{a_3})]$. In embodiments, the joint Wagner function for 2N output modes can be formalized for zero-mean Guassian quantum states in equation (21) as:

$$W(r_{a_2}, r_{a_3})=\mathcal{N}_r\exp\{-\tfrac{1}{2}(r_{a_2}, r_{a_3})v^{-1}(r_{a_2}, r_{a_3})^T\}$$

In embodiments, $\mathcal{N}_r$ is a normalization factor and the subscript "T" denotes the transpose $r_{a_2}=(x_{a_2}^1, y_{a_2}^1, x_{a_2}^2, y_{a_2}^2, \ldots, x_{a_2}^N, y_{a_2}^N)$ which are the vectors associated with the Alice and Bob modes. In embodiments, v is a 4N×4N covariance matrix (CM) which can be written in the following block form of equation (22) as:

$$\mathcal{V} = \begin{pmatrix} \mathcal{V}_{a_2}I_{2N} & \mathcal{V}_{a_2a_3}I_{2N} \\ \mathcal{V}_{a_2a_3}^T I_{2N} & \mathcal{V}_{a_3}I_{2N} \end{pmatrix}$$

In embodiments, $v_{a_2}=\text{diag}(v_{a_2}^1, v_{a_2}^2, v_{a_2}^3, \ldots, v_{a_2}^N)$ and $v_{a_3}=\text{diag}(v_{a_3}^1, v_{a_3}^2, \ldots, v_{a_3}^N)$ are the 2N×2N covariance matrices for the Alice and Bob modes, respectively. Furthermore, $v_{a_2}v_{a_3}$ may be a 2N×2N matrix that describes a correlation between the Alice ($\hat{r}_{a_2}$) and Bob ($\hat{r}_{a_3}$) modes. In embodiments, the stationary covariance matrix $v^j$ for the j-th pair of Alice and Bob modes is given by equation (23) as:

$$v^j|_{-\infty}^{\infty} \mathcal{Q}^j \mathcal{T}^j(\omega) \mathcal{N}_{in}^j \mathcal{T}^{jT}(-\omega) \mathcal{Q}^{jT} d\omega$$

In embodiments, $\mathcal{N}_{in}^j=\text{diag}(\mathcal{N}_2^j, \mathcal{N}_3^j, \mathcal{N}_b^j)$ is the diffusion matrix along with $\mathcal{N}_2^j=$ $$\mathcal{N}_3^j = \begin{pmatrix} 0 & 1 \\ 0 & 0 \end{pmatrix}, Q^j = \text{diag}(Q_2^j, Q_3^j, Q_b^j), Q_3^j = \frac{1}{2}\begin{pmatrix} 1 & 1 \\ -i & -i \end{pmatrix},$$

and $\mathcal{N}_b^j=$

Furthermore, in embodiments, $T^j(\omega)=F^j(\omega)[\mathcal{A}^j - i\omega]^{-1}v^j-I$, $v=\text{diag}(\sqrt{2\gamma_2^j}, \sqrt{2\gamma_2^j}, \sqrt{2\gamma_3^j}, \sqrt{2\gamma_3^j}, \sqrt{2\gamma_m^j}, \sqrt{2\gamma_m^j},)$, $F^j(\omega)=\text{diag}(\sqrt{2\gamma_2^j}, \sqrt{2\gamma_2^j}, \sqrt{2\gamma_3^j}\sqrt{2\gamma_3^j},1,1)$, and the drift matrix for the j-th element in the $[\mathcal{A}^j$ array is given by equation (24) as:

$$\mathcal{A}^j = \begin{pmatrix} -\gamma_2^j & 0 & 0 & 0 & -i\mathcal{G}_2^j & 0 \\ 0 & -\gamma_2^j & 0 & 0 & 0 & i\mathcal{G}_2^j \\ 0 & 0 & -\gamma_3^j & 0 & 0 & i\mathcal{G}_3^j \\ 0 & 0 & 0 & -\gamma_3^j & i\mathcal{G}_3^j & 0 \\ i\mathcal{G}_2^j & 0 & 0 & i\mathcal{G}_3^j & -\gamma_m^j & 0 \\ 0 & i\mathcal{G}_2^j & i\mathcal{G}_3^j & 0 & 0 & -\gamma_m^j \end{pmatrix}$$

In embodiments, according to the Routh-Hurwitz criterion, the stability of the steady state solution can be guaranteed if the real part of the eigenvalues of $\mathcal{A}^j$ are negative.

In embodiments, N-distant independent plasmonic graphene waveguides can be used to generate an N-partite CV entangled state. In embodiments, such a system can be realized by sending the output of the Alice modes ($\hat{a}_{out_2}^j$) from each plasmonic graphene waveguide to an intermediate common node (given the name "Charlies" for any non-limiting examples and shown as 809 in FIG. 8) where a multipartite Bell measurement can be performed. In embodiments, an N-partite entangled state of the Bob modes ($\hat{a}_{out_3}^j$), previously discussed, is prepared.

As shown in FIG. 8, Charlie combines the Alice nodes on an array of N-1 beam splitters (BS) with ratios of 1:1, 1:2, ..., 1:N-1 which then performs multipartite homodyne detection on the BS output fields. Thus, a classical result TT is generated. Thus, the transformed position (phase) quadratures (shown as 808 in FIG. 8) of Alice modes are given by equation (25) as:

$$\hat{x}_{a_2}^1 \to \Sigma_j^N \hat{x}_{a_2}^j/\sqrt{N}(\hat{y}_{a_2}^1 \to \Sigma_j^N \hat{y}_{a_2}^j/\sqrt{N})$$

And, the transformed (phase) quadratures of the Alice modes are also given by equation (26) as:

$$\hat{x}_{a_2}^{N-1} \to \left(\sum_j^{N-1} \hat{x}_{a_2}^j - (N-1)\hat{x}_{a_2}^N\right)/\sqrt{N(N-1)}\left(\hat{y}_{a_2}^{N-1} \to \left\{\sum_j^{N-1} \hat{y}_{a_2}^j - (N-1)\hat{y}_{a_2}^N\right\}/\sqrt{N(N-1)}\right)$$

In embodiments, the first N-1 outputs $\hat{a}_{F,out_2}^j$ (with j=1, 2, 3, ..., N-1) in the multipartite Bell measurement of the Alice modes are homodyne when detected in the position quadrature $\hat{x}_{a_2}^j$, whereas the last output $\hat{a}_{F,out_2}^N$ is detected in the phase quadrature $\hat{y}_{a_2}^N$. As a result, all the Bob modes can be efficiently driven into an N-partite entangled state. In embodiments, the corresponding Wigner function of the conditioned Bob modes for the detection result, $\overline{r_a}$, is given by equation (27) as:

$$W(r_b/\overline{r}_a) = \mathcal{N}'\exp\left\{-\frac{1}{2}r_b\mathcal{V}'^{-1}r_b^T\right\}$$

In embodiments, $\mathcal{V}'$ is a 2N×2N covariance matrix that describes the N-partite entangled Gaussian state. In embodiments, any first-order terms are not shown in equation (27) as such terms have a negligible impact and can be zeroed by feedback. In embodiments, the covariance matrix $\mathcal{V}'$ for N-identical plasmonic graphene waveguides $$\mathcal{V}_{a_2}^j = \mathcal{V}_a, \mathcal{V}_{a_3^j} = \mathcal{V}_{a_3} \text{ and } \mathcal{V}_{a_2^j a_3^j} = \mathcal{V}_{a_2 a_3}$$

where, $j\in\{1, 2, 3, \ldots, N\}$ may be written in a block form as shown in equation (28):

$$\mathcal{V}' = \begin{pmatrix} \mathcal{V}'_{a_3} & \mathcal{V}'_{a_3 a_3} & \cdots & \mathcal{V}'_{a_3 a_3} \\ \mathcal{V}'_{a_3 a_3} & \mathcal{V}'_{a_3} & & \mathcal{V}'_{a_3 a_3} \\ \vdots & & \ddots & \vdots \\ \mathcal{V}'_{a_3 a_3} & \cdots & \mathcal{V}'_{a_3 a_3} & \mathcal{V}'_{a_3} \end{pmatrix}$$

In embodiments, $\mathcal{V}'_{a_3}=\mathcal{V}_{a_3}-(N-1)\mathcal{V}_{a_2a_3}Z_1\mathcal{V}_{a_2}^{-1}Z_1\mathcal{V}_{a_2a_3}/N-\mathcal{V}_{a_2a_3}/N$ and $\mathcal{V}'_{a_3a_3}=\mathcal{V}_{a_2a_3}Z_1\mathcal{V}_{a_2}^{-1}Z_1\mathcal{V}_{a_2a_3}/N-\mathcal{V}_{a_2a_3}Z_2\mathcal{V}_{a_2}^{-1}Z_2\mathcal{V}_{a_2a_3}/N$ are 2N×2N submatrices with $\mathcal{Z}_1$=diag(1,0) and $\mathcal{Z}_2$=diag(0,1). In embodiments, the stationary entanglement between any pair of Bob modes (as previously discussed) can be measured by the logarithmic negativity shown in equation (29) as:

$$E_N^{(j)} = \max[0, -\ln 2\eta_j^-]$$

Figure 9:
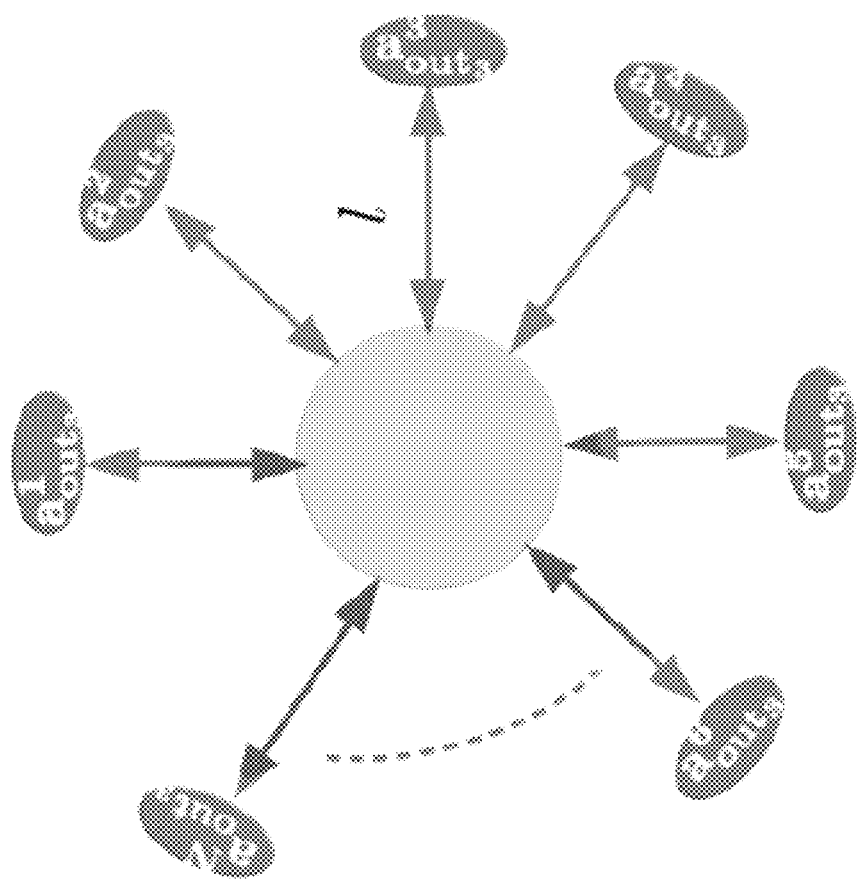
FIG. 9 is a diagram of an example star-like network.

In embodiments, $\eta_j^-$ is the smallest symplectic eigenvalue of the partially transposed covariance matrix $\mathcal{V}^{ij}$ of the j-th pair of Bob modes. In embodiments, the N-partite stationary entanglement at the output can be exploited to realize a quantum network. In embodiments, the channel and transmission associated losses can be described using an effective beam splitter with a transmittivity $\eta=\eta_0 e^{-\alpha l/10}$ where $\alpha$ is the classical channel attenuation in dB/km, $\eta_0$ is describes possible inefficiencies, l is the distance travelled by each field (i.e., the classical channel length). In embodiments, it follows that the corresponding covariance matrix is given by Is this subscript supposed to be loss? $\mathcal{V}'_{loss}=\eta \mathcal{V}'+\frac{1}{2}(1-\eta)\mathbb{I}$. In embodiments, $\mathbb{I}$ is the 2N×2N identity matrix. In embodiments, all Bob modes may be equidistant from the central hub (i.e., l) as shown in FIG. 9.

FIG. 10A is an example electronically generated graph that shows a calculated logarithmic negativity for the number of modes N versus the number of Bob modes (i.e., the number of independent plasmonic waveguides). In FIGS. 10A and 10B, non-classical depth D=0 (points A) and non-classical depth D=0.494 (points B) are shown. In embodiments, the calculations are performed for different degrees of non-classicity of the driving microwave field. Furthermore, the calculations are conducted in the absence of losses (shown in FIG. 10A) and in the presence of losses (shown in FIG. 10B). In embodiments, the nonclassicity associated with the microwave field results in an increase of the entanglement between any pair of Bob modes (as shown by red square in FIGS. 10A and 10B). For example, with $\gamma_m/\omega_m=0.001$, $\gamma_2/\omega_m=\gamma_3/\omega_m=0.02$, $G_2/\omega_m=0.2$, $G_3/\omega_m=0.16$, $\eta_0=0.99$, l=0.1 km, and $\alpha=0.005$, the logarithmic negativity is maximally boosted for D=0.494. However, when the number of Bob modes increase, the logarithmic negativity becomes more sensitive (i.e., degrades). In embodiments, simulations show that incorporating the nonclassicality of the driving microwave field results in a logarithmic negativity greater than zero for up to 10 Bob modes with separation distances of approximately 0.1 km. Thus, Charlie can generate any type of entangled state among different number of Bob modes by choosing a proper array of BSs.

In embodiments, the output N-partite Gaussian entangled states can also be classified as a quantum channel for multipartite quantum teleportation. In embodiments, a determination of the performance of this multipartite quantum channel can be made, based on Bell measurements, in terms of the teleportation fidelity of a pure coherent state among the Bob modes $(\hat{a}_3^1, \hat{a}_3^2, \hat{a}_3^3, \ldots, \hat{a}_3^N)$. Thus, for CV teleportation protocols, the Bob combines an unknown input coherent state $|\alpha_{in}\rangle$ (that is to be teleported) with the part of the entangled state, $\hat{a}_3^1$ on a beam splitter and measures two quadratures $1/\sqrt{2}(\hat{x}_{in}-\hat{x}_{a_3}^1)$ and $1/i\sqrt{2}(\hat{p}_{in}-\hat{p}_{a_3}^1)$, where $\alpha_{in}=(\hat{x}_{in}+i\hat{p}_{in})/\sqrt{2}$. In embodiments, the measurement outcomes are sent to N-1 receivers simultaneously. Thus, each of the N-1 Bob modes displaces its state according to the measurement outcomes. In embodiments, the corresponding optical teleportation fidelity is given by equation (30) as:

$$F_{a_3^1:a_3^j}^{opt} = \frac{1}{1+2\eta_j^-}$$

As shown in equation (30), $\eta_j^-$ may be equivalent to the smallest symplectic eigenvalue of the partially transposed $\mathcal{V}'$ under the bipartition $a_3^1$: $a_3^2, a_3^3, \ldots, a_3^{N-1}$. In embodiments, the optical fidelity is directly related to the logarithmic negativity $E_N^{(n)}$.

Figure 11A:
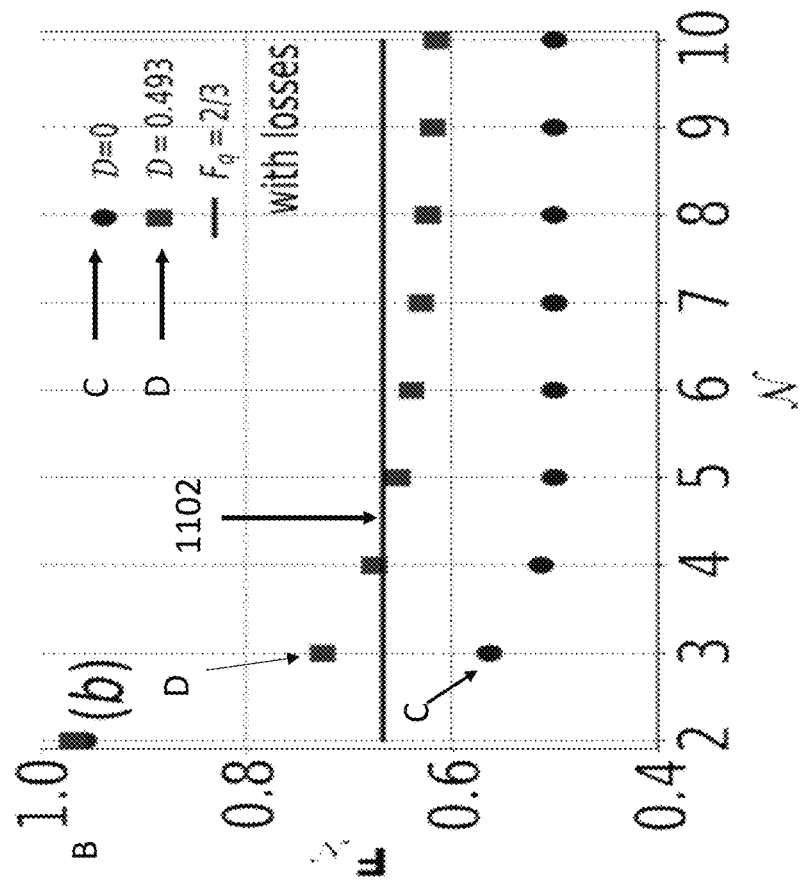
FIGS. 11A and 11B are example electronically generated graphs.
Figure 11B:
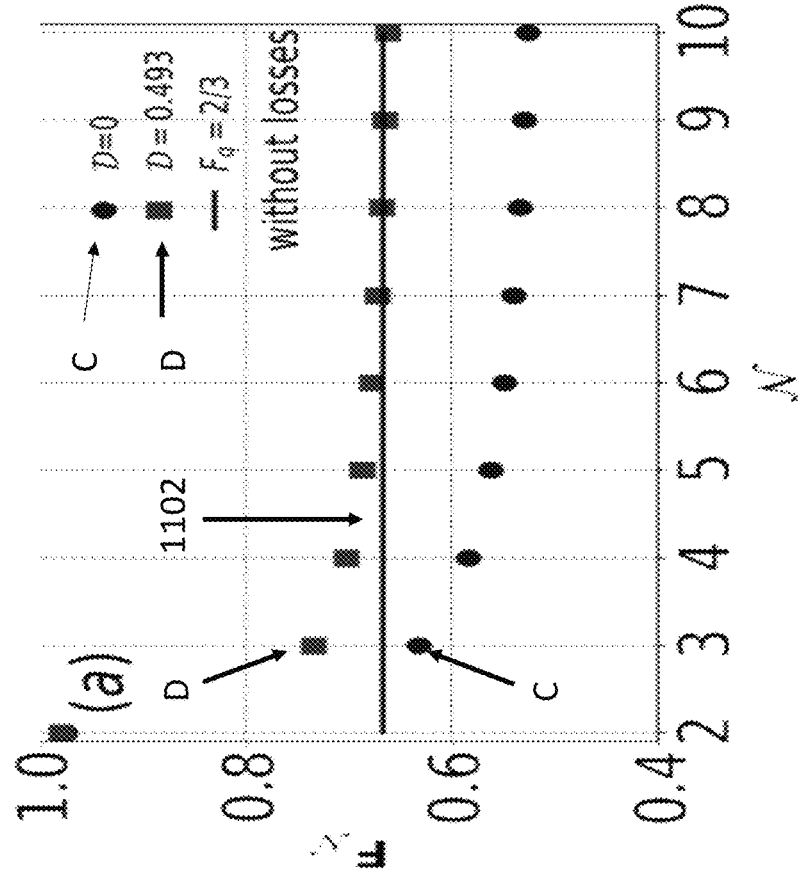

FIGS. 11A and 11B show example electronic graphical representations of the optimal teleportation fidelity $\mathcal{F}_N$ of the unknown incoherent state which is calculated as a function of the number of Bob modes. In these non-limiting examples, zero, and D=0 (points C in FIGS. 11A and 11B) and D=0.494 (points D in FIGS. 11A and 11B) nonclassicality depths are analyzed. In embodiments, lossless is analyzed in FIG. 11A and realistic free space channels are analyzed in FIG. 11B. In embodiments, the analysis shows that nonclassicality of the driving microwave field enables the threshold for a secured quantum teleportation limit of $F_q=\frac{2}{3}$ (shown as 1102 in FIGS. 11A and 11B) to be exceeded even in the presence of losses. In embodiments, the electronic graphical information indicates up to four Bob modes have fidelity beyond the threshold.

Figure 12:
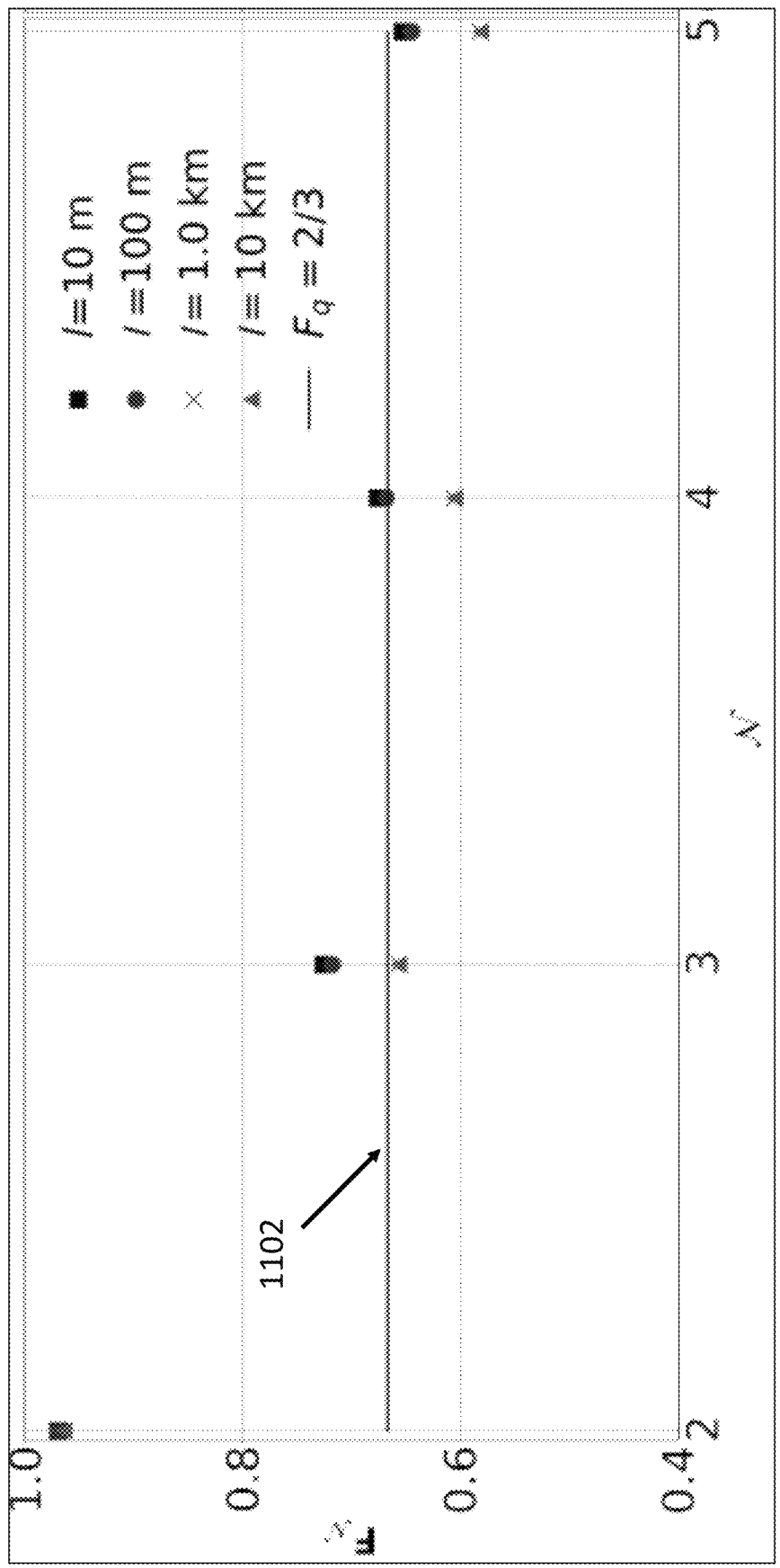
FIG. 12 is an example electronically generated graph.

FIG. 12 shows another electronic graphical representation of the robustness of the teleportation fidelity versus the number of Bob modes $\mathcal{N}$ for different values of the separation distance l. In embodiments, with D=0.494, free space channel losses are taken into account and all other parameters are the same as those associated with FIGS. 10A and 10B. In embodiments, the teleportation fidelity can include the required quantum threshold for l=0.1 km and $\mathcal{N}$ =3 or, alternatively, l=10 m and $\mathcal{N}$ =4. Accordingly, a trade-off occurs between the separation distance and the number of Bob modes.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

While various actions are described as selecting, displaying, transferring, sending, receiving, generating, notifying, and storing, it will be understood that these example actions are occurring within an electronic computing and/or electronic networking environment and may require one or more computing devices, as described in FIG. 5, to complete such actions. Furthermore, it will be understood that these various actions can be performed by using a touch screen on a computing device (e.g., touching an icon, swiping a bar or icon), using a keyboard, a mouse, or any other process for electronically selecting an option displayed on a display screen to electronically communicate with other computing devices. Also, it will be understood that any of the various actions can result in any type of electronic information to be displayed in real-time and/or simultaneously on multiple user devices. For FIGS. 2A, 2B, 4A, 4B, 10A, 10B, 11A, 11B, and 12, the electronic graphs may be generated by a computing device, such as device 600, and displayed via a graphical user device (GUI) associated with the computing device. While the use of "Alice" and "Bob" is used in both FIGS. 3 and 8, the term "Alice" and the term "Bob" may be for different features described in each of the figures. Furthermore, "Alice" and "Bob" are used being used as a descriptive term to describe systems, methods, and/or devices.

No element, act, or instruction used in the present application should be construed as critical or essential unless explicitly described as such. Also, as used herein, the article "a" is intended to include one or more items and may be used interchangeably with "one or more." Where only one item is intended, the term "one" or similar language is used. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A system, comprising:
N-distant independent plasmonic graphene waveguides, wherein the N-distant independent plasmonic graphene waveguides are used to generate an N-partite continuous variable entangled state, wherein:
the N-partite continuous variable entangled state is generated by sending an output from each of the N-distant plasmonic graphene waveguides to an intermediate common node,
a multipartite Bell measurement occurs based on sending the output from each of the N-distant plasmonic graphene waveguides to the intermediate common node,
the intermediate common node combines particular nodes on an array of N-1 beam splitters (BS) with particular ratios and performs multipartite homodyne detection on BS output fields,
continuous variable-entangled state teleports an unknown coherent state over a long distance with high efficiency,
the teleportation is secure based on the fidelity being above a particular threshold, and
the continuous-variable entangled state is controlled through the interaction of a microwave mode with two optical modes.

* * * * *